United States Patent Office 2,854,396
Patented Sept. 30, 1958

2,854,396

PETROLEUM PROSPECTING

John M. Hunt and Richard N. Meinert, Tulsa, Okla., assignors, by mesne assignments, to Jersey Production Research Company No Drawing. Application November 24, 1954
Serial No. 471,104

13 Claims. (Cl. 208—8)

The present invention is broadly concerned with a method for locating sources of petroleum. More particularly it relates to a method for identifying and evaluating source rocks thereby indicating the probable or improbable existence of nearby oil reservoirs. The invention especially concerns a process wherein a sample of ancient rock is finely pulverized and thereafter subjected to a sequence of processing steps and analytical procedures whereby the quality of the rock in so far as its being a valuable petroleum source rock may be determined. The invention is further concerned with a method for recovering the hydrocarbons that are present in a rock without decomposing the hydrocarbons.

Before entering into a detailed description of the present invention, it is considered necessary first to briefly review the present state of knowledge with respect to the formation, occurrence and location of subterranean petroleum accumulations. A brief discussion of this type will assist greatly in more completely understanding and appreciating the nature and value of the invention.

At the present time most petroleum geologists are fairly well agreed upon the conclusion that petroleum reservoirs are to be found in ancient basins which at one time housed inland seas or other bodies of water. It is further postulated that these bodies of water contained organic matter of one type or another which gradually settled to and accumulated at the bottom of the basin. Here the organic matter was apparently transformed by one or another procedure into hydrocarbons. Then, as sedimentary material such as finely divided rock entered the basin, the organic matter and hydrocarbon materials were depressed downwardly through the earth's surface and were subjected to increasing temperatures and pressures. Very often this phenomenon was accompanied by tremendous changes in the earth's surface which further affected the nature of the phenomenon.

As the earth's surface changed and the ancient basins were depressed and subjected to extreme pressures, the basin bottoms were highly compacted with the result that the water and oil which were present in the bottoms were gradually squeezed out of the resulting formations. In general it is felt that the water and oil migrated through surrounding formations that were characterized by lower pressures than were the formations from which they were exuded.

As the oil and water migrated through the earth's surface, several things are considered to have happened. First, in some areas it has been postulated that the oil and water migrated directly or indirectly to the earth's surface where they were essentially lost to the atmosphere. In other areas it is considered that the oil and water entered large porous zones such as subterranean beds of sand, porous limestone, and the like. Due to the structure of these porous regions, the water was able to migrate substantially entirely through the zones but the oil was forced to remain behind. In other words the porous formations were associated or placed in juxtaposition with earth formations which served to trap the oil within the porous zones. Here the oil has remained right up to the present time until efforts to tap the oil accumulations have been successsful.

Summarizing momentarily, it is therefore the concensus of opinion among most modern geologists that several prerequisites are required for the formation and existence of an oil reservoir. First, there must have been a source rock in which the oil was originally formed and from which it migrated. Second, there must have been a nearby reservoir rock characterized by a porous or open-type structure in which the migrating oil could accumulate. Third, there must have been a suitable surrounding earth structure or other means for trapping the oil within the reservoir rock.

In all petroleum prospecting operations, it is the object of the personnel involved to penetrate the earth's surface and to tap a reservoir rock formation. It follows that this is a very difficult and time-consuming procedure for a number of reasons. In the first place the personnel are dealing with portions of the earth that are hidden from view and that are often thousands of feet underground. Second, even the most advanced methods of seismology, geological prospecting, etc, are unable to predict with complete accuracy the location of petroleum reservoirs. Hence the search for petroleum entails a combination of past experience, a variety of technical procedures and considerable study to determine the optimum place for a well to be drilled.

Once a drilling operation has commenced, a large number of physical observations are continually carried out upon samples from the bore hole and upon the bore hole itself in order to ascertain whether the drilling efforts are apt to meet with success. The data are also collected in an effort to evaluate the whole surrounding area in order to assist in making decisions concerning the location and advisability of future drilling operations.

One item that is observed with great interest in any drilling operation is the discovery of petroleum source rock, since (as pointed out earlier) it is the modern belief that an oil bearing reservoir rock is always associated with source rock. In other words the finding of a source rock formation is considered to be very indicative of a nearby oil accumulation in associated porous traps.

When using the term "source rock" it must be appreciated that the term at the present time means somewhat different things to different people. For example one geologist may consider a good source rock to be characterized by a particular color, while another geologist may look for a particular odor or color and odor combination. In other words, the evaluation of a source rock at the present time is done almost entirely by physical observation. It follows that serious discrepancies and differences of opinion may exist among geologists concerning the identification and evaluation of any given rock formation, especially if an oil accumulation has not as yet been discovered in the vicinity of the rock in question. It further follows that discrepancies and differences of opinion in this matter can be an extremely serious matter, since drilling operations are extremely expensive and "dry holes" are often a complete loss. It is estimated, for example, that the drilling of a conventional hole about ten thousand feet deep in new areas may cost in the order of about $300,000.

Accordingly, it is an objective of the present invention to improve and enhance the methods that are presently employed for locating subterranean oil reservoirs. It is a further objective of the invention to afford a method for more accurately and definitively ascertaining whether a particular rock formation is a petroleum source rock. It follows that it is also an objective of the invention to greatly reduce the amounts of time and money that are presently expended in the search for oil. And it is a still further objective to recover the hydrocarbons that are present in a rock without chemically decomposing the hydrocarbons.

The present invention realizes the aforementioned objectives by subjecting a rock formation or a sample of rock derived from an earth formation to a sequence of extraction and adsorption steps whereby hydrocarbons in the rock or rock sample are isolated and recovered. In a particular embodiment of the invention, various chemical and physical tests are also utilized in order to evaluate the rock formation or sample in so far as its quality as a petroleum source rock is concerned. In connection with this evaluation technique, samples of rock that are suitable for the purposes of the invention include the samples that are conventionally obtained during a conventional petroleum drilling operation. Samples that are particularly preferred in rotary drilling operations are those obtained by coring procedures, since core samples have been found to more truly represent a particular formation than do other samples, as for example the cuttings that are continuously recovered by rotary drilling. The cuttings from cable tool drilling are also suitable for use in the present procedure.

In accordance with the invention a portion of rock or a rock sample is first crushed and pulverized into extremely small particles, preferably less than about 40 microns in size. The pulverized rock is then refluxed for a period of several hours with an oil-miscible organic solvent in combination with a water-miscible organic solvent. This procedure has been found to extract the hydrocarbon components of a rock sample without chemically destroying or altering any of the hydrocarbons. The procedure, however, has also been found to extract compounds other than pure hydrocarbons, for example carboids and various nitrogen, sulphur and oxygen compounds. These non-hydrocarbons are removed from the product of the refluxing step in a manner to be described later hereinafter.

The oil-miscible organic solvent and the water-miscible organic solvent that are employed in the extraction step should preferably be of a type that boils below about 100° C.; and the two solvents should be substantially completely miscible with one another, especially at the refluxing temperature. It has further been found that the oil-miscible organic solvent should ordinarily constitute a major portion of the combined solvent and that this component should preferably be carbon disulfide or an aromatic hydrocarbon such as benzene or toluene.

The water miscible organic solvent should be a low boiling, oxygenated aliphatic compound such as a ketone or alcohol. Preferred compounds are acetone, methanol ethyl ketone, di-ethyl ketone, methanol and ethanol. It will be particularly noted that it is generally preferred to employ one of the aforementioned ketones in combination with one of the alcohols, especially in about equal proportions.

Particularly effective combinations of the aforementioned solvents are solvent mixtures containing about 70 volume percent of benzene or carbon disulfide in combination with about 15 volume percent of acetone and 15 volume percent of methanol. Either one or both of these solvent combinations may be employed, and it has been found especially effective to employ one of the solvent combinations in a first extraction step and the other combination in a second such step. The combination of solvents used simultaneously as described above produces results not attainable by use of a single solvent alone or the sequential use of individual solvents.

The total extract from the extraction procedure is distilled to remove the solvent from the extract; and the last portions of solvent are preferably removed by evaporation at substantially atmospheric temperature.

Following this vaporization step, the rock extract is contacted with an organic solvent which is substantially completely miscible with petroleum at atmospheric temperatures. Such solvents include benzene, carbon disulfide, toluene, carbon tetrachloride, chloroform, ether and ethylene dichloride. This step has been found to dissolve all of the hydrocarbons that are contained in the original extract to the exclusion of materials that are commonly referred to as carboids. The insoluble carboids are separated from the resulting solution, and the solution is again vaporized in order to remove the solvent from the rock extract.

The residue from this vaporization step, which is now carboid-free, is next contacted at substantially atmospheric temperature with a paraffinic solvent containing from about 4 to 8 carbon atoms and preferably 7 carbon atoms. This procedure redissolves the hydrocarbons in the rock extract and ensures the precipitation of asphaltic compounds rich in nitrogen, sulfur and oxygen known as asphaltenes.

The resulting solution is then contacted with an adsorbent which is adapted to perform an adsorptive fractionation on the dissolved materials and to separate the hydrocarbons in the solution from the remaining sulfur, nitrogen-, and oxygen-containing compounds that may be present in one or both of the solutions. Such a fractionation procedure is well known as such in the art and is popularly identified as a chromatographic procedure and employs adsorbents such as activated alumina, silica gel, magnesia, clays, and the like. An especially preferred adsorbent for use in carrying out the present invention is alumina which has been activated by heating to about 450° C. for a period of four hours. A desirable bed of activated alumina for the purpose has a length to diameter ratio of the order of about 10 to 1.

Having separated the hydrocarbons from the non-hydrocarbons in this chromatographic procedure, the hydrocarbons are isolated and weighed or measured in any conventional manner. One particularly effective way comprises successive elution with n-heptane and benzene. The hydrocarbons may be separated from the elutriants as by the vaporization procedure described earlier. The amount of hydrocarbons thus found in a rock is expressed hereinafter as barrels per acre foot (bbls. H. C./acre-ft.).

The aforedescribed procedure constitutes the embodiment of the present invention wherein the hydrocarbons that are contained within a rock formation or formation sample may be recovered and isolated therefrom. In another embodiment of the invention several analytical procedures are also incorporated for the purpose of evaluating the "source rock" quality of the original rock material. Several criteria are utilized in connection with this embodiment and objective of the invention.

First, a sample of the original rock or formation sample is quantitatively analyzed for its organic carbon and nitrogen contents. These are conventional quantitative procedures and need not be described in detail here. Such procedures are well known and well understood by those skilled in the art.

Second, a small sample of the solution that is obtained by dissolving the original extract in carbon disulfide, is subjected to examination with an infrared spectrometer. Specifically, the optical densities of the sample are determined at wave lengths in the range of about 8.8 microns and also 13.3 microns. The two ranges may actually extend from about 8.3 to 8.8 microns and from about 13.2 to 13.6 microns respectively.

The results that are obtained with the two procedures just described are then evaluated along with the amount of hydrocarbons which is recovered from the chromatographic procedure. It has been established that these three findings, constitute an excellent measure of the quality of the original material in so far as its being a source rock of petroleum is concerned. For any given type of formation sequence, it has been now found that each one of the aforementioned procedures may be employed to classify the material tested as being a good source rock, a fair source rock or a poor source rock.

The actual numerical values obtained by these procedures may vary slightly depending upon the particular geological sequence involved, but the variations are not considered to be very great in magnitude. The procedures have been applied extensively to sand-shale sequences, and they have also been applied to a lesser degree to carbonate sequences. In both instances the results have been substantially the same.

The correlations that have been found to exist between the source rock quality of a particular formation or rock sample and the results of the three procedures above are presented in the following table.

TABLE I

*Correlation between test procedures and source rock quality*

| Quality of Sample | Bbls. H. C. per acre ft. | Optical Density Ratio, 8.8/13.3 Microns | Carbon/ Nitrogen weight ratio |
|---|---|---|---|
| Good Source Rock | 3–30 | 0–1.0 | 8–25 |
| Fair Source Rock | 1–3 | 1.0–1.5 | 4–8 |
| Poor Source Rock | 0–1 | 1.5–20 | 0–4 |

In utilizing the three criteria contained in the above table, it is contemplated that the best single criterion is the one involving the amounts of hydrocarbons that are present in the rock. It is preferred, however, that the evaluation obtained by this criterion be employed in conjunction with at least one of the other criteria; and it is particularly preferred that all three criteria be utilized. In the event of conflicting information, an average of the evaluations should be employed.

The present invention is now further illustrated by reference to the following specific example wherein samples of various rock formations were subjected to the hydrocarbon extraction procedure described earlier and wherein the samples were also evaluated as to their source rock quality.

In processing each one of the samples, a substantially identical procedure was followed. The samples were non-reservoir core samples obtained from formations 2000 to 9000 feet deep and ranged in age from the Upper Cretaceous to the Mississippian.

Each rock sample, constituting a core sample about ½ lb. in weight was crushed in a conventional rock crusher and then pulverized to a particle size of about 30 mesh. The pulverized sample was then further subdivided into extremely small particles less than about 40 microns in diameter with a conventional type of jet air pulverizer.

Each finely divided rock sample was then sampled and analyzed for its organic carbon and its nitrogen contents. Conventional quantitative analytical procedures were utilized to obtain this information.

Each one of the samples was then refluxed for a period of several hours with a solvent mixture comprising about 70 volume percent benzene and equal parts of acetone and methanol. The insoluble material from this extract step was separated from the extract portion and was subjected to a second refluxing operation in the presence of carbon disulfide in admixture with acetone and methanol.

The two extracts were then combined, and the solvents in the combined extract then vaporized leaving behind the rock extract. As pointed out earlier, it has been found that the rock extract at this stage usually contains hydrocarbons, carboids, and non-hydrocarbons such as sulfur-, nitrogen- and oxygen-containing compounds. Accordingly the hydrocarbons were isolated and recovered in the following manner.

First, each rock extract was taken up or contacted with carbon disulfide at substantially atmospheric temperature. This procedure served to dissolve all but the carboids, which were then separated by centrifugation from the resulting solution.

A portion of the carbon disulfide solution was then examined in a double-beam type infrared spectrometer for its optical densities at the wave length values of about 8.8 and 13.3 microns.

Each carbon disulfide solution was evaporated and this extract was then dissolved in a solvent such as normal-heptane and centrifuged to remove the asphaltenes. The resulting solution percolated through a bed of activated alumina. The bed was then flushed with successive amounts of normal-heptane, and benzene, which served to displace the hydrocarbons by chemical type from the bed and to keep them separated from the non-hydrocarbons. The hydrocarbons were separately recovered and measured. The results that were obtained by the use of these procedures on 8000 feet of section in the southwest part of the Powder River Basin of Wyoming are presented in the following table. It will be noted that each one of the tests actually represents the work that was done on a number of individual samples.

TABLE II

*"Source rock" quality of formations in Southwest Powder River Basin, Wyoming*

| Formation Sampled | Soluble H. C.'s, Bbls./Acre-Ft. | Optical Density Ratio | C/N Weight Percent Ratio |
|---|---|---|---|
| A (Frontier) | 6 | 0.6 | 9 |
| B (Thermopolis) | 3 | 0.7 | 9 |
| C (Cloverly) | 3 | 0.7 | 12 |
| D (Steele) | 1.5 | 1.2 | 7 |
| E (Sundance) | 3 | 1.2 | 3 |
| F (Morrison) | 0.2 | 4 | 2.5 |
| G (Embar) | 0.1 | 20 | 0.7 |
| H (Amsden) | 0.1 | 3 | 1.8 |
| I (Madison) | 0.1 | 20 | 1.0 |

In examining the results in the above table, it is important to point out that samples A–C were core samples of non-reservoir rocks which are adjacent to prolific oil pools containing between 50 and 500 estimated million barrels of recoverable oil. Samples D and E are from non-reservoir rocks adjacent to oil pools containing 10 to 30 million barrels of recoverable oil, and no commercial oil pools have been found to be adjacent to the samples F–I in the area studied. Thus, the value of these criteria in pointing out the "source rock" quality of a particular area are considered to be very well established by the geological conditions.

What is claimed is:

1. A method of recovering hydrocarbons from a petroliferous rock core sample without chemical destruction of the hydrocarbons which comprises reducing the sample to a state of finely divided particles, refluxing the particles with a petroleum-miscible organic solvent in combination with a water-miscible organic solvent until substantially all of the hydrocarbons in the particles are extracted by the combined hot solvents, vaporizing the solvents from the resulting extract, contacting the solven-free extract with an organic solvent which is substantially completely miscible with petroleum at atmospheric temperature whereby the hydrocarbons in the extract are dissolved to the exclusion of carboid material, separating the carboids from the solution, vaporizing the organic solvent from the carboid-free solution to recover a residue containing the carboid-free hydrocarbons, contacting the residue with a paraffinic solvent to form a second solution of the carboid-free hydrocarbons, chromatographically separating the hydrocarbons within the second solution from non-hydrocarbons, and collecting the separated hydrocarbons.

2. A method as defined in claim 1 in which the water-miscible solvent and the peroleum-miscible solvent boil below about 100° C.

3. A method as defined in claim 1 in which the water-miscible solvent is a substantially equi-volume mixture of acetone and methyl alcohol and the petroleum-miscible solvent is benzene.

4. A method as defined in claim 2 in which the petroleum miscible solvent is carbon disulfide.

5. A method as defined in claim 1 in which the chromatographic separation is carried out by percolating the second solution through a bed of activated alumina.

6. A method as defined in claim 5 in which the bed has a length to diameter ratio of the order of about 10/1.

7. In a method of evaluating the petroleum source rock quality of a rock formation the steps comprising reducing a sample of the formation to finely divided particles, refluxing the particles with a petroleum-miscible organic solvent in combination with a water-miscible organic solvent until substantially all of the hydrocarbons in the particles are extracted by the combined hot solvents, vaporizing the solvents from the resulting extract, contacting the solvent-free extract with an organic solvent which is substantially completely miscible with said hydrocarbons at atmospheric temperature, separating the resulting hydrocarbon solution from any insoluble organic material, vaporizing the organic solvent from the hydrocarbon solution to recover a residue containing said hydrocarbons, contacting the residue with a paraffinic solvent to form a second solution of the hydrocarbons, chromatographically separating the hydrocarbons within the hydrocarbon solution from non-hydrocarbons by adsorptive fractionation of the hydrocarbons in said second solution, and collecting and determining the amount of said hydrocarbons.

8. A method as defined in claim 7 in which a sample of the formation is quantitatively analyzed for its organic carbon to nitrogen weight ratio.

9. A method as defined in claim 7 in which the organic solvent which is employed to dissolve the hydrocarbons in the solvent-free extract is carbon disulfide.

10. A method as defined in claim 9 in which a portion of the carbon disulfide solution is analyzed for its optical densities at wave lengths of about 8.8 microns and 13.3 microns, and the ratio of the density at 8.8 microns to the density at 13.3 microns then determined.

11. A method as defined in claim 7 in which the finely divided particles are refluxed with a solvent mixture consisting of about 70 volume percent benzene, 15 volume percent acetone and 15 volume percent methanol.

12. A method as defined in claim 11 in which the particles are subjected to two refluxing steps with the solvent mixture.

13. A method as defined in claim 7 in which the solvent mixture in the second step consists of about 70 volume percent carbon disulfide, 15 volume percent acetone and 15 volume percent methanol.

References Cited in the file of this patent

UNITED STATES PATENTS

| | | |
|---|---|---|
| 1,721,719 | Terry et al. | July 23, 1929 |
| 1,836,020 | Freytag | Dec. 15, 1931 |
| 2,173,842 | Horner | Sept. 26, 1939 |
| 2,367,664 | Campbell | Jan. 23, 1945 |
| 2,606,143 | Smith et al. | Aug. 5, 1952 |
| 2,670,317 | Adams | Feb. 23, 1954 |
| 2,712,986 | Huckabay | July 12, 1955 |

OTHER REFERENCES

Kalichevsky: "Modern Methods of Refining Lubricating Oils" (Am. Chem. Soc., Monograph Series No. 76), p. 81. Pub. in 1938 by Reinhold Publ. Corp., New York, N. Y.